A. J. SCHUMACHER.
FISHING ROD SUPPORT.
APPLICATION FILED MAR. 17, 1922.

1,435,085. Patented Nov. 7, 1922.

Inventor
Amanda J. Schumacher
By C. C. Shepherd
Attorney

Patented Nov. 7, 1922.

1,435,085

UNITED STATES PATENT OFFICE.

AMANDA J. SCHUMACHER, OF COLUMBUS, OHIO.

FISHING-ROD SUPPORT.

Application filed March 17, 1922. Serial No. 544,529.

*To all whom it may concern:*

Be it known that I, AMANDA J. SCHUMACHER, a citizen of the United States, residing at Columbus, in the county of Franklin and State of Ohio, have invented certain new and useful Improvements in Fishing-Rod Supports, of which the following is a specification.

The present invention is directed to improvements in fishing rod supports, and has for its primary object to provide a device of this character so constructed that the fishing rod can be held in the desired position while in use.

A further object of the invention is to provide a device of this character so constructed that it can be firmly secured on the bank for supporting a fishing pole in its proper position.

A still further object of the invention is to provide a support of this nature so formed that the rod cannot be accidentally displaced from the support when the line and rod are left unattended.

Still another object of the invention is to provide a support for fishing rods which is extremely simple in construction, and one in which the rod can be readily removed or replaced, and when in place the line will aid in holding the rod against accidental removal.

With these and other objects in view, as will appear as the description proceeds, the invention consists in the novel features of construction, combinations of elements and arrangements of parts, and hereinafter to be fully described and pointed out in the appended claim.

Figure 1:
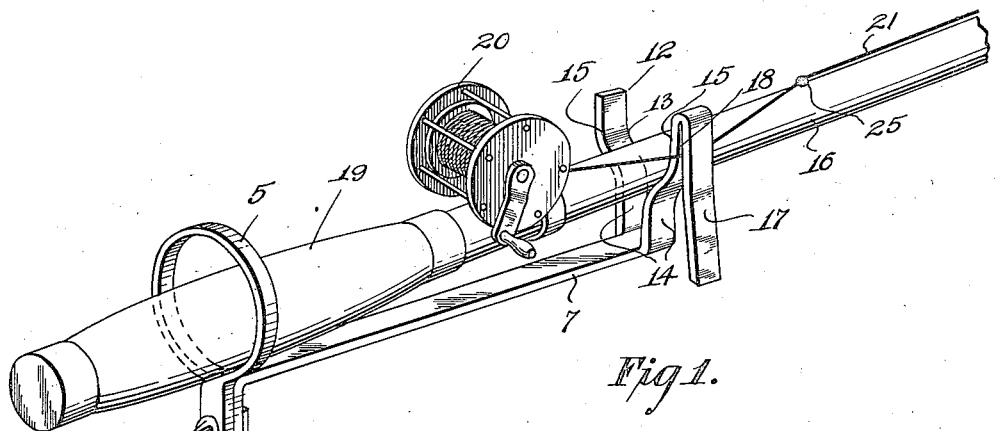
Figure 1 is a perspective view of the support showing the rod engaged therewith.
Figure 2:
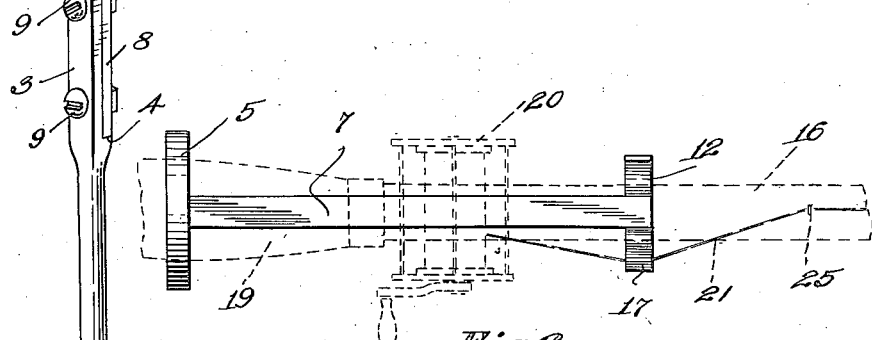
Figure 2 is a top plan view thereof.

Referring to the drawing 1 designates the rod, which is formed of suitable metal, and has its lower end provided with a point 2, said point serving to more readily permit the rod to be placed in the ground.

The upper end of the rod 1 is flattened, as at 3 so as to provide a shoulder 4. The upper end of the flattened portion 3 terminates in a ring 5, the ring being of such width as to extend beyond or face of the flattened portion 3 to provide an abutment 6, the purpose of which will appear later.

A horizontal arm 7 is employed and has its inner end terminating in a vertical plate 8, the plate being adapted to lie flush against the adjacent face of the flattened portion 3, and at which time the lower end of said plate rests upon the shoulder 4, while the upper end thereof engages the abutment 6. Thus it will be seen that the plate 8 can be readily attached to the rod 1, and to hold the plate 8 in place clamping bolts 9 are passed through the perforations 10—11 formed, respectively, in the flattened portion 3 and plate 8.

The outer end of the arm 7 is provided with a fork 12, which has its fingers 13 for a portion of their length arranged to provide parallel ears 14, which terminate at their upper ends in outwardly bowed portions 15, said portions forming a seat for receiving the fishing rod 16, as clearly shown in Figure 1 of the drawing.

One of the fingers 13 terminates in an integral downwardly extending strip 17 which forms in conjunction with the adjacent portion 15 a slot 18, which opens downwardly.

The rod 16 is provided with a conventional handle 19 and reel 20 and it will be noted that the line 21 engages the slot 18 so that should the rod be left unattended and a fish takes the bait at the end of the line, the line will be drawn taut and the rod naturally subjected to undue vibration, which would tend to displace the same. Since the line is engaged in said slot it will in an obvious manner prevent this accidental displacement of the rod. It will be of course understood that the reel will be locked against unwinding so that the line 21 will immediately become taut when stress is imparted thereto when a fish takes the bait.

Figures 3, 4:
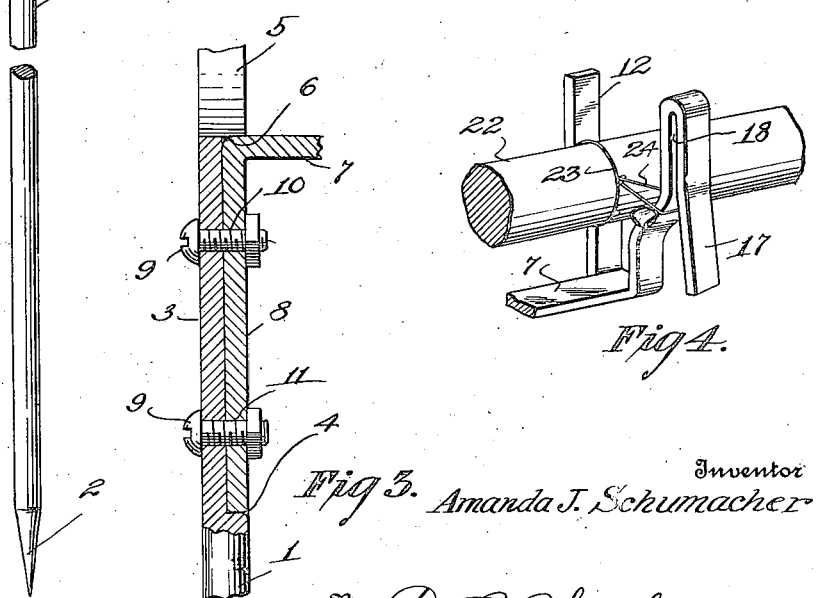
Figure 3 is a sectional view on line 3—3 of Figure 1.
Figure 4 is a detail fragmentary perspective view showing a common form of pole engaged in the support.

In Figure 4 there is shown the ordinary fishing pole 22, and in order to secure this type of pole against accidental displacement a cord 23 is tied thereto and a loop 24 provided which can be conveniently passed over the strip 17 for engagement in the slot 18 should strain be applied to the pole 22.

From the foregoing description it will be seen that a support for fishing rods has been provided which is formed from two pieces of suitable metal, and that rods of different diameter may be supported. Some rods are extremely smaller in diameter and in such cases the rod will lie in the space between the ears 14.

Since the line 21 is engaged in the guide eyes 25, it is obvious that this will aid in holding the line in such position as to more effectively hold the rod against accidental displacement.

What I claim is:

A device of the class described comprising a rod, a ring carried by the upper end of the rod, an arm supported by the rod, a fork carried by the outer end of the arm, one portion of the fork terminating in a downwardly directed strip to provide a slot, said slot serving to receive a fish line when a fishing rod is engaged in the ring and fork.

In testimony whereof I affix my signature.

AMANDA J. SCHUMACHER.